United States Patent
Wang

(10) Patent No.: US 6,525,170 B1
(45) Date of Patent: *Feb. 25, 2003

(54) HIGHLY BRANCHED POLYESTERS THROUGH ONE-STEP POLYMERIZATION PROCESS

(75) Inventor: Jin-Shan Wang, Pittsford, NY (US)

(73) Assignee: Eastman Kodak Company, Rochester, NY (US)

( * ) Notice: Subject to any disclaimer, the term of this patent is extended or adjusted under 35 U.S.C. 154(b) by 4 days.

This patent is subject to a terminal disclaimer.

(21) Appl. No.: 09/919,096

(22) Filed: Jul. 31, 2001

(51) Int. Cl.$^7$ ................................. C08G 65/04
(52) U.S. Cl. .............. 528/421; 528/271; 528/403; 528/406; 528/408; 528/409; 528/418; 524/714; 524/755; 524/765
(58) Field of Search ............ 528/271, 403, 528/406, 408, 409, 418, 421; 524/714, 755, 765

(56) References Cited

U.S. PATENT DOCUMENTS

| | | |
|---|---|---|
| 3,669,939 A | 6/1972 | Baker et al. |
| 4,857,630 A | 8/1989 | Kim |
| 5,041,516 A | 8/1991 | Frechet et al. |
| 5,196,502 A | 3/1993 | Turner et al. |
| 5,225,522 A | 7/1993 | Turner et al. |
| 5,227,462 A | 7/1993 | Turner et al. |
| 5,418,301 A | 5/1995 | Hult et al. |
| 5,514,764 A | 5/1996 | Frechet et al. |
| 5,567,795 A | 10/1996 | Vicari et al. |
| 5,663,247 A | 9/1997 | Sorensen et al. |
| 5,663,260 A | 9/1997 | Frechet et al. |
| 6,252,025 B1 | 6/2001 | Wang et al. |

OTHER PUBLICATIONS

Atsushi Kameyama et al; "Synthesis Of Reactive Polyesters By A Regioselective Addition Reaction Of Diepoxides With Diacyl Chlorides And Their Chemical Modification"; Macromolecules; 1992; vol. 25; pp. 2307–2311.

Paul J. Flory; "Molecular Size Distribution In Three Dimensional Polymers. VI. Branched Polymers Containing A–R–$B_{f-1}$ Type Units"; J. Amer. Chem. Soc.; 1952; vol. 74; pp. 2718–2723.

Todd Emrick et al; "An $A_2+B_3$ Approach To Hyperbranched Aliphatic Polyethers Containing Chain End Epoxy Substitutes"; Macromolecules; 1999; vol. 32; pp. 6380–6382.

Mitsutoshi Jikei et al; "Communications To The Editor—Synthesis Of Hyperbranched Aromatic Polyamide From Aromatic Diamines And Trimesic Acid"; Macromolecules; 1999; vol. 32; pp. 2061–2064.

Young H. Kim; "Lyotropic Liquid Crystalline Hyperbranched Aromatic Polyamides"; J. Amer. Chem. Soc.; 1992; vol. 114; pp. 4947–4948.

C. J. Hawker et al; "One–Step Synthesis Of Hyperbranched Dendritic Polyesters"; J. Amer. Chem. Soc.; 1991; vol. 113; pp. 4583–4588.

Jin–Shan Wang; US Serial No. 09/697,205; filed Oct. 26, 2000; "Highly Branched Polyesters Through One–Step Polymerization Process".

Primary Examiner—Samuel A. Acquah
(74) Attorney, Agent, or Firm—Andrew J. Anderson

(57) ABSTRACT

A polymerization process for producing highly branched polyesters is disclosed comprising reacting functional groups A and B of multi-functional branching monomer reactants of the formula A—L—$B_n$, where one of A and B represents an epoxide group, the other of A and B represents an acid chloride group, L represents a linking group between A and B, and n is at least 2. In accordance with a specific embodiment of the invention, branched polyesters are obtained which have a number average molecular weight of at least 1000 and a ratio of weight average molecular weight to number average molecular weight of less than 2. The invention provides a process for producing highly branched polyesters in one reaction step. The invention has the capability of making highly branched structures of high molecular weight and low polydispersity and has the advantages of not requiring multi-step reactions and purification. The invention yields highly branched polyesters having a multiplicity of very reactive epoxy or acid chloride or both on the outside surface which can be further converted to other functional groups, including polymerizable groups and initiating groups, which can undergo further chain extensions.

18 Claims, No Drawings

HIGHLY BRANCHED POLYESTERS THROUGH ONE-STEP POLYMERIZATION PROCESS

FIELD OF THE INVENTION

The present invention relates to processes for the preparation of highly branched functional and reactive polymers, and to novel highly branched functional and reactive polyesters prepared through a one-step process.

BACKGROUND OF THE INVENTION

Branched polymers and copolymers have attracted considerable attention over the past decades, since many advanced materials with new or improved properties can be obtained therefrom. The terms "hyperbranched" and "highly branched" used herein with respect to branched polymers are intended to designate polymers having a relatively high percentage of propagated branching sites per number of polymerized monomer units, e.g. at least one branching site per every ten monomer units, preferably at least one branching site per every five monomer units and more preferably at least one branching site per every two monomer units. Highly branched polymers can be made by multi-step or one step processes. Multi-step generation processes were exemplified by Frechet in U.S. Pat. No. 5,041,516 and by Hult in U.S. Pat. No. 5,418,301. Both patents described that the highly branched polymers known as dendrimer or "starburst polymer" were made through a series of growth steps consisting of repeatedly reacting, isolating, and purifying.

One-step process was first conceptualized by Flory (J. Am. Chem. Soc., 74, p2718 (1952)) who demonstrated by theoretical analysis that a highly branched and soluble polymers could be formed from monomers comprising the structure $AB_2$, where A and B are reactive groups, by one-step condensation polymerization. In contrast to the dendrimers, the polymer formed by $AB_2$ polymerization is randomly branched. One-step process for formation of a highly branched polymer may also use an $A_2+B_3$ approach. In $A_2+B_3$ polymerization, di- and tri-functional monomers are reacted together. For ideal $A_2+B_3$ polymerization, intramolecular cyclization must be minimized as a competing and chain terminating process during polymer propagation, all A groups and all B groups should have near equal reactivity in both the monomers as well as the growing polymers, and the A and B groups should have exclusive reactivity with each other. In view of such requirements, relatively few specific combinations of $A_2+B_3$ polymerization schemes have been proposed.

With regard to $AB_2$-type monomers, Baker in U.S. Pat. No. 3,669,939 described that highly branched aliphatic polyesters could be prepared by one-step melt condensation polymerization of monomers having a single carboxylic acid and multiple alcohols. Kim et al in U.S. Pat. No. 4,857,630 disclosed that hyperbranched polyphenylenes can be prepared by one-step polymerization of monomers such as (3,5-dibromophenyl)boronic acid and 3,5-dihalophenyl Grignard reagents. Hawker et al disclosed that all aromatic, highly branched polyesters can be made by melt polymerization of 3,5-bis(trimethylsiloxy)benzoyl chloride (J. Am. Chem. Soc., 113, p4583 (1991)). U.S. Pat. No. 5,196,502 disclosed the use of diacetoxybenzonic acids and monoacetoxydibenzonic acids to produce wholly aromatic polyesters. U.S. Pat. No. 5,225,522 and 5,227,462 disclose highly branched aliphatic-aromatic polyesters and processes for making the same. U.S. Pat. No. 5,418,301 disclosed a process for preparing dendritic macromolecules. U.S. Pat. No. 5,514,764 disclosed preparation of hyperbranched aromatic polyesters and polyamides by a one-step process of polymerizing a monomer of the formula A—R—$B_2$ where R represents an aromatic moiety. U.S. Pat. No. 5,567,795 disclosed synthesis of highly branched polymers in a single processing step by using branching aromatic monomers and an end-capping monomer. U.S. Pat. No. 5,663,247 disclosed a hyperbranched macromolecule of polyester type comprising a central monomeric or polymeric epoxide group containing nucleus and at least one generation of a branching chain extender having at least three reactive sites of which at least one is a hydroxyl or hydroxyalkyl substituted hrodroxyl group and at least one is a carboxyl or terminal epoxide group and the process for making the same.

With regard to $A_2+B_3$ polymerization, Jikei et al (Macromolecules, 32, 2061 (1999)), e.g., has reported synthesis of hyperbranched aromatic polyamides from aromatic diamines and trimesic acid. Emrick et al (Macromolecules, 32, 6380 (1999)) has disclosed the synthesis of hyperbranched aliphatic polyethers by means of proton-transfer polymerization of 1,2,7,8-diepoxyoctane as $A_2$ monomer and 1,1,1-tris(hydroxymethyl)ethane as $B_3$ monomer.

It is known that ring open reaction between terminal epoxides with acid chlorides, in the presence of tetrabutylammonium bromide, can form an anti-Markinovkov ester product containing a primary chloride. This reaction was applied to diepoxides and diacid chlorides to form polyesters (Kameyama et al., Macromolecules 25, p.2307 (1992)). Copending, commonly assigned U.S. Ser. No. 09/697,205 of Wang describes the synthesis of highly branched functional and reactive polyesters using an $A_2+B_3$ approach by reacting multi-functional acid chloride and multi-functional epoxide monomers, where at least one of such monomers is at least tri-functional. The use of such monomers advantageously results in highly branched polyesters having a multiplicity of very reactive epoxy or acid chloride groups or both on the outside surface which can be further converted to other functional groups. One-step processes for formation of a highly branched polymer which use an $A_2+B_3$ approach, however, require care to prevent undesired competing reactions, such as crosslinking and chain terminating processes, during the desired polymer propagation. As a result, molecular weight may not be as high, and polydispersity may not be as low, as may be desired for the resulting polymer. No prior art teaches the use of $AB_2$ type monomers comprising epoxide and acid chloride reactive groups to prepare highly branched polymers.

It would be desirable to provide a process for producing highly branched polyesters of high molecular weight and low polydispersity without requiring the use of multi-step reactions and purification. It would be further desirable to provide such a process which results in highly branched polyesters having a multiplicity of very reactive epoxy or acid chloride groups or both on the outside surface which can be further converted to other functional groups.

SUMMARY OF THE INVENTION

In accordance with one embodiment of the invention, a polymerization process for producing highly branched polyesters is disclosed comprising reacting functional groups A and B of multi-functional branching monomer reactants of the formula A—L—$B_n$, where one of A and B represents an epoxide group, the other of A and B represents an acid chloride group, L represents a linking group between A and B, and n is at least 2; wherein polymerization proceeds by reaction of an epoxide group of a first monomer with an acid chloride group of second monomer to open the epoxide group ring and form a reaction product having an ester linkage between the first and second monomers, and repeating such esterification reaction between additional epoxide groups and acid chloride groups of the multifunctional monomers and reaction products of the multifunctional monomers to form a highly branched polyester.

In accordance with a specific embodiment of the invention, branched polyesters are obtained in accordance with the above process which have a number average molecular weight of at least 1000 and a ratio of weight average molecular weight to number average molecular weight of less than 2.

The invention provides a process for producing highly branched polyesters in one reaction step. The invention has the capability of making highly branched structures of high molecular weight and low polydispersity and has the advantages of not requiring multi-step reactions and purification. The invention yields highly branched polyesters having a multiplicity of very reactive epoxy or acid chloride or both on the outside surface which can be further converted to other functional groups, including polymerizable groups and initiating groups, which can undergo further chain extensions.

DETAILED DESCRIPTION OF THE INVENTION

The present invention is directed to prepare highly branched polyester in a single step procedure from an $AB_n$ type monomer (defined as branching monomer) with low polydispersity. The present process utilizes the ring opening reaction of epoxide groups with acid chloride groups between multifunctional monomers at a sufficient temperature and for a sufficient period of time to produce a highly branched macromolecule of the polyester type. In accordance with the invention, the use of a multifunctional branching monomer having reactive epoxide and acid chloride groups has been found to be an especially useful path to providing highly branched polyester materials. The acid chloride groups are in general more reactive than carboxylic acid groups, and the reaction between acid chloride and epoxide groups proceeds under generally less stringent conditions than epoxides and carboxylic acid groups. Further, the acid chloride and epoxide groups can advantageously directly provide highly reactive end groups in the resulting highly branched polymers. The use of an $AB_n$ type branching monomer in accordance with the invention also allows for the preparation of generally higher molecular weight polymers as well as relatively lower polydispersity relative to that obtained from $A_2+B_3$ type polymerization.

In accordance with the invention, the branching monomers useful in the present invention has the following formula:

where one of A and B represents an epoxide group, the other of A and B represents an acid chloride group, L represents a linking group between A and B, and n is at least 2. Preferably, n represents 2 or 3, and most preferably n represents 2. L may be any monomeric, oligomeric, or polymeric compound nucleus, such as a further substituted or unsubstituted straight or branched alkyl, cycloalkyl, aryl or alkylaryl linking group moiety, or an oligomeric or polymeric chain moiety.

The A—L—$B_n$ multifunctional branching monomers used in the present invention may be prepared from commercially available starting materials using conventional reaction procedures. Tri-acid chloride compounds, e.g., may be reacted with either one or two equivalents of a glycidol compound to form, respectively, primarily di-acid chloride, mono-epoxide compounds or mono-acid chloride, di-epoxide compounds. A specific representative reaction procedure for the preparation of a multifunctional monomer is presented in Example 1 below, wherein 1,3,5-benzenetricarbonyl trichloride is reacted with an equimolar amount of glycidol. A mixture of different types of A—L—$B_n$ multifunctional branching monomers may be formed from such reaction. The polymer resulting from the polymerization of a mixture of these different types of A—L—$B_n$ may be different from one from a single purified A—L—$B_n$ monomer. Multifunctional branching monomers may be pre-formed and isolated prior to subsequent reaction, or may be prepared in-situ in the formation of a highly branched polyester in accordance with the invention.

Examples of multifunctional branching monomers for use in accordance with the invention include:

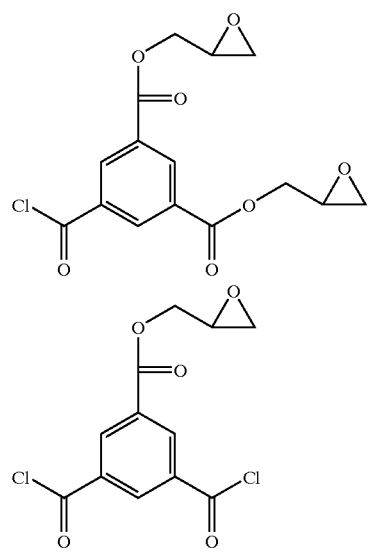

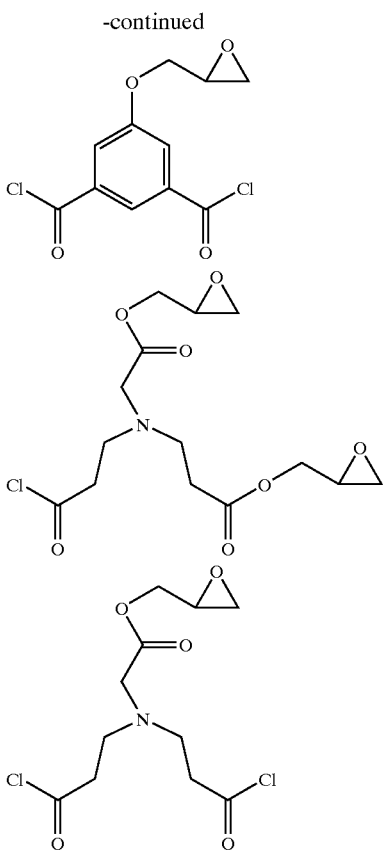

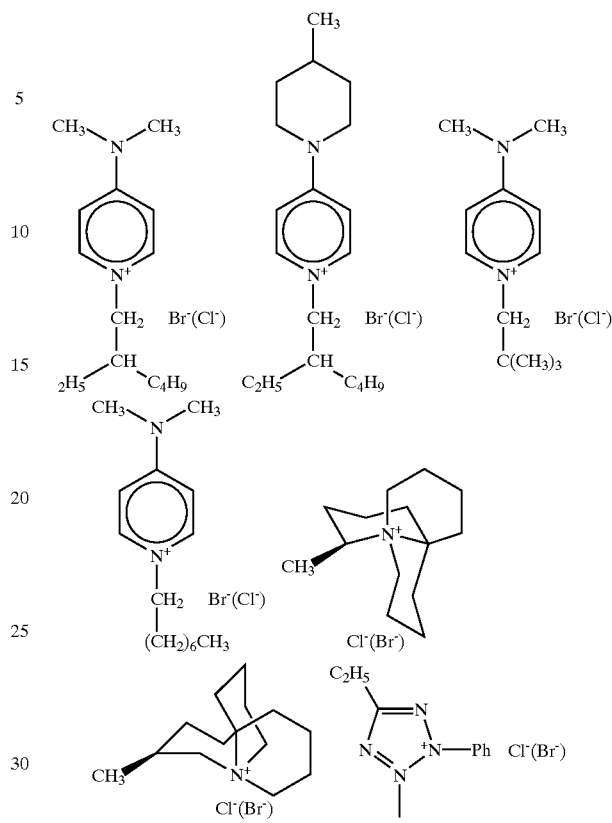

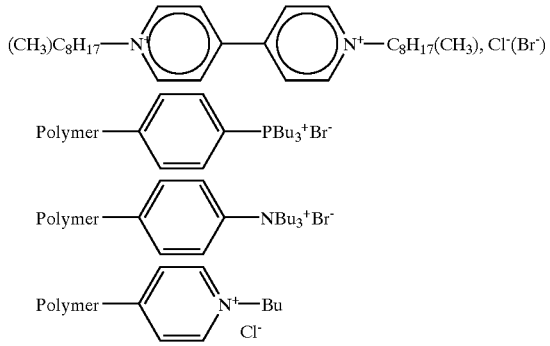

Highly branched polyesters may be prepared in accordance with the invention employing a pure single branching monomer compound in a "self-condensation" reaction, or a mixture of a variety of branching monomers or branching monomers and non-branching monomers may be employed to achieve a combination of self-condensation and co-condensation.

Catalysts, while not necessarily required, may be used to make hyperbranched polyesters in accordance with the present invention to facilitate reaction between the epoxide and acid chloride groups and induce the formation of polymers with a narrower molecular weight distribution (i.e., lower polydispersity, which is defined as the ratio of weight-average molecular weight to number-average molecular weight). Preferred catalysts for use in preferred embodiments of the invention include onium salts, polyethers and cryptand based complexes, and amine containing Lewis bases.

Preferred onium salts for use as catalysts include but are not limited to: $Me_4N^+Br^-$, $Pr_4N^+Br^-$, $Bu_4N^+Br^-$, $Bu_4P^+Br^-$, $Bu_4N^+Cl^-$, $Bu_4N^+F^-$, $Bu_4N^+I^-$, $Bu_4P^{30}$ $Cl^-$, $(C_8H_{17})_3NME^+$ $Cl^-$, $(C_8H_{17})_3PEt^+Br^-$, $C_6H_{13}NEt_3^+Br^-$, $C_7H_{17}NE_3^+Br^-$, $C_{10}H_{20}NEt_3^+Br^-$, $C_{12}H_{25}NEt_3^{30}Br^-$, $C_{16}H_{33}NEt_3^+Br^-$, $C_6H_{13}PEt_3^+Br^-$, $C_6H_5CH_2NEt_3^+Br^-$, $C_{16}H_{33}PMe_3^+Br^-$, $(C_6H_5)_4P^+Br^-$, $(C_6H_5)_4As^+Cl^-$, $(C_6H_5)_4As^+Br^-$, $(C_6H_5)_3PMe^+Br^-$, $(HOCH_2CH_2)_3NBu^+Br$, $Bu_4N^+OH^-$, $Bu_4N^+(ClCrO_3)^-$, $Bu_4N^+CN^-$, $Bu_4N^+BH_3CN^-$, $Bu_4N^+(H_2PO_4)^-$, $Bu_4N^+(H_2PO_2)^-$, $Bu_4N^+1/2(PtCl_6)^-$, $Bu_4N^+PF_6^-$, $Bu_4N^+HSO_4^-$, $Bu_4N^+[CH_3CH(OH)CO_2]^-$, $Bu_4N^+NO_3^-$, $Bu_4N^+IO_4^-$, $Bu_4N^+ReO_4^-$, $Bu_4N^+BF_4^-$, $Bu_4N^+[B(C_6H_5)_4]^-$, $Bu_4N^+[CF_3SO_3]^-$, $R_3$—$N+(CH_2)_{2-4}O(CH_2)_{2-4}N+R_3$, $Br^-(Cl^-)$ [where R represents alkyl group]

Any polyethers or cryptand based complexes which can facilitate the reaction can be used in the present invention as catalyst. Examples of these compounds include but are not limited to polyethylene glycol and derivatives such as $HO(CH_2CH_2O)_nH$ (n=2–600), $RO(CH_2CH_2O)H$ where R=$C_1$ to $C_{13}$ alkyl groups, $N(CH_2CH_2OCH_2CH_2OCH_3)_3$, $N(CH_2CH_2OCH_2CH_2OH)_3$, crown ethers and cryptands such as 18-crown-5, 15-crown-5, dibenzo-18-crown-6, dicyclohexano-18-crown-6, cryptand 211, cryptand 222, cryptand 221.

Any amine containing Lewis bases can also be used in the present invention. Example of these Lewis bases are but not limited to trialkyl substituted amine, pyridine, dimethylaminopyridine.

The amount of catalyst used in the present invention can preferably vary from 0.1% to 30%, more preferably from 0.1% to 10%, and most preferably from 0.1% to 2%, based on the monomer molar concentration.

In specific embodiments, the resultant highly branched polymers prepared according to the present invention have a multiplicity (e.g., represented by x in Scheme 1 below) of either epoxy or acid chloride groups on the outside surface. The resulting functional groups on the highly branched polymer surface will depend on whether the multiple B groups of the branching monomer are the epoxide or the acid chloride groups. The epoxy or acid chloride groups on the surface of polymer can be easily converted to other types of functional groups by means of organic reactions. Examples of these functional groups include but are not limited to water soluble/dispersible groups, crosslinking groups such as vinyls, initiating and polymerizable groups for further chain extensions, imaging and photographically useful groups such as dyes and couplers, bio-compatible groups, and the like. For example, acid chloride or epoxy end groups can be easily converted into hydrophilic groups such as —$NH_2$, —COOH, —$SO_3H$, —OH, —$N^+R_3$, and the like as illustrated in scheme 1.

-continued

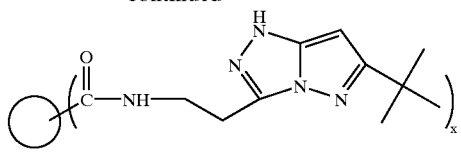

Similarly other types of functional polymers such as surface active polyesters, heat (temperature, pH, and the like)-sensitive smart polyesters, light or electron harvesting polymers, etc., can be obtained.

The functional hyperbranched polymers can also be used for further chain extension to form polymers with higher molecular weight and even more complex architectures, There are two ways to make chain extension.

First, one or more initiating sites can be introduced into the end of hyperbranched polyester. These macroinitiators can be used in any kinds of living and non-living chain polymerizations such as radical, anionic, cationic, group Scheme 1

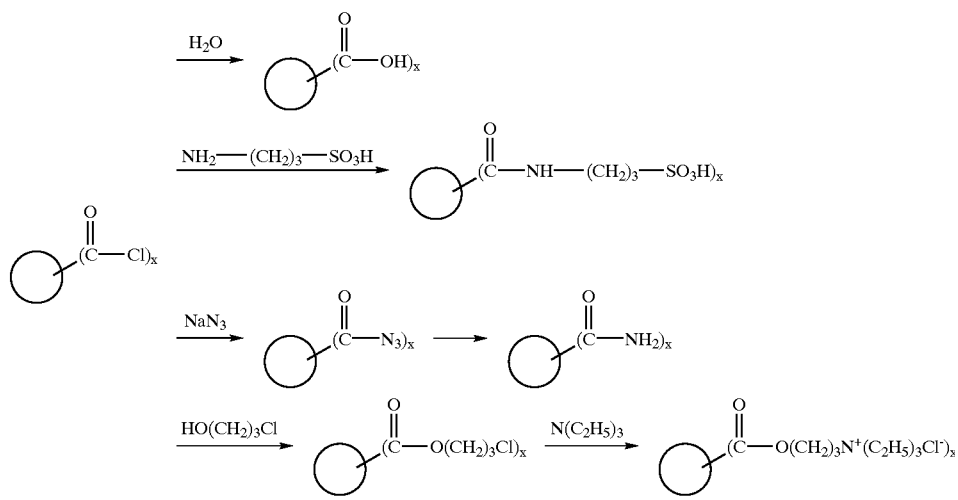

Also, highly branched polymers with various photographically useful end groups as described in U.S. Pat. No. 6,252,025, the disclosure of which is incorporated by reference, can be made via the present invention. For example, a polymeric magenta coupler can be formed as in Scheme 2.

Scheme 2

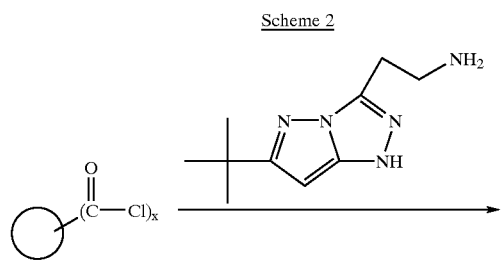

transfer polymerization, atom transfer radical polymerization, telomerization, coordination polymerization, and the like to form polymers with more complex architectures such as star polymers with polyester cores, hyperbranched polyesters based block/graft/super branched polymers and the like. Thus, the present invention provides a method to make even complex polymers or copolymers comprising polyesters and vinyl polymers in the same molecule.

For example, a macroinitiator for Atom Transfer Radical Polymerization (ATRP, as described, e.g., in U.S. Pat. Nos. 5,789,487 and 5,807,937, the disclosures of which are incorporated by reference) can be made by modification of epoxy ended highly branched polymer with trichloroacetyl chloride (Scheme 3) and can be used in ATRP of methyl methacrylate (Scheme 4):

Scheme 3

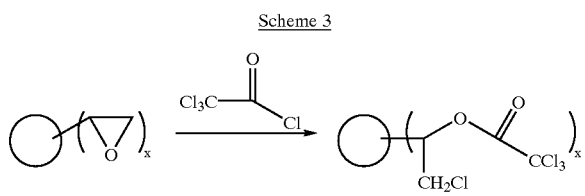

Scheme 4

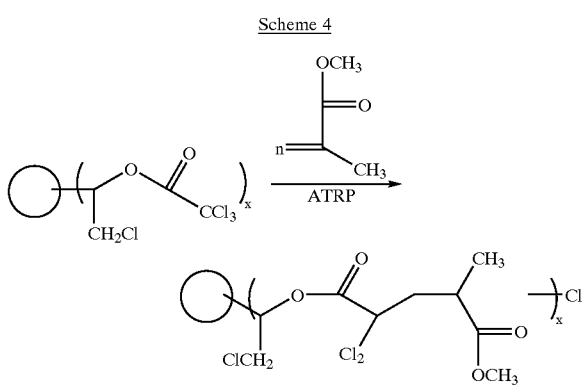

Alternatively, epoxy and acid chloride ended hyperbranched polyesters can react with any mono- or multiple functional monomers, oligomers or polymers (such as amine, OH, epoxy, or acid chloride group containing of monomers, oligomers or polymers) to form even more complex polymers or copolymers.

For example, the reaction between multiple acid chloride ended hyperbranched polyester and diepoxides yields highly branched polyesters with higher molecular weight (Scheme 5).

Scheme 5

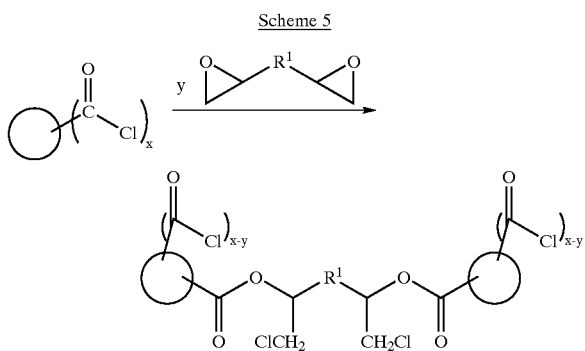

where: $R^1$ is straight or branched aryl or alkyl group.

As another example, the reaction between multiple acid chloride ended hyperbranched polyester and mono $NH_2$ containing polyether compounds such as Jeffamine™ (Huntsman) compounds may result in hydrophilic star copolymer with highly branched polyester as the core and Jeffamine™ as the branches.

The present polymerization process may be conducted as bulk polymerization, i.e., in absence of solvent. However, it can also be carried out in any solvent, which might include but are not limited to ethers, cyclic ethers, alkanes, cycloalkanes which may be substituted, aromatic solvents, halogenated hydrocarbon solvents, acetonitrile, dimethylformamide, ethylene carbonate, dimethylsulfoxide, dimethylsulfone, sulfolane, alcohol, water, mixture of such solvents, and supercritical solvents such as carbon dioxide, alkanes in which any H may be replaced with F, etc. Preferred solvents include toluene, cyclohexanone, anisole, o-dichlorobenzene, DMF, sulfolane, ethyl benzene.

The present process may also be conducted in accordance with known suspension, emulsion, microemulsion, gas phase, dispersion, precipitation, template, reactive injection molding, phase transfer polymerization processes, melting polymerization, and the like.

The polymerization can be conducted in accordance with known batch, semi-batch, continuing processes, tube-flow, and the like. The polymerization temperature can be varied from –200 to 500° C., more typically from –100 to 200° C., and preferably from 20 to 120° C. Polymerization pressure may typically vary from $10^{-8}$ atm to $10^3$ atm. Combinatorial chemistry and experimental design can be used in the context of the present invention to optimize the polymerization reaction conditions.

The molecular weight of polymers prepared in accordance with the present invention may vary from about 100 to $10^8$, and the glass transition temperatures from –300 to 1000° C. (more typically –200 to 500° C.) depending upon the polymerization reactant compositions. The process in accordance with the invention generally allows for the production highly branched polyesters of relatively high molecular weight and low molecular weight dispersity. In accordance with a specific embodiment of the invention, branched polyesters may be obtained which have a number average weight of at least 1000 and a polydispersity index (PDI) of less than 2, where PDI is the ratio of weight average molecular weight to number average molecular weight.

The final polymers can be purified with known processes such as precipitation, extraction, and the like. Polymers can be used in the forms of solid particle, solution, dispersion, latex, and the like.

The highly branched polymers and copolymers prepared in the present invention can be used in a variety of applications such as plastics, elastomers, fibers, engineering resins, coatings, paints, adhesives, asphalt modifiers, detergents, diagnostic agents and supports, dispersants, emulsifiers, rheology modifiers, viscosity modifiers, in ink and imaging compositions, as leather and cements additives, lubricants, surfactants, as paper additives, as intermediates for chain extensions such as polyurethanes, as additives in inkjet, printing, optical storage, photography, photoresist, and coloration of polymer, as water treatment chemicals, cosmetics, hair products, personal care products, polymeric dyes, polymeric couplers, polymeric developers, antistatic agents, in food and beverage packaging, pharmaceuticals, carriers for drug and biological materials, slow release agent formulations, crosslinking agents, foams, deodorants, porosity control agents, complexing and chelating agents, carriers for chiral resolution agents, catalysts, carriers for gene transfection, for encapsulation, as light harvesting materials, as non-linear optical materials, and to form super macromolecular assemble.

EXAMPLES

The invention can be better appreciated by reference to the following specific embodiments.

Example 1

Synthesis of Acid Chloride Ended Hyperbranched Polyester from Multifunctional Monomer Having Single Epoxy Group and Multiple Acid Chloride Groups A typical procedure for the preparation of a multifunctional monomer and polymerization thereof to form a highly branched polyester in accordance with the invention is described.

Preparation of solution of multifunctional monomer (3): The monomer was first synthesized as follows. All reagents were weighted out under a nitrogenous atmosphere and purified prior to use by vacuum distillation. 1,3,5-benzenetricarbonyl trichloride (compound 1) (35 grams) was added to a 250 ml three neck round bottom flask with a stir bar in a dry box. The flask was stopped, removed from the dry box and then attached to a water condenser under nitrogen gas. 50 ml of dry toluene was added to dissolve the 1,3,5-benzenetricarbonyl trichloride. A mixed solution containing 9.78 grams (1 molar eq. relative to the 1,3,5-benzenetricarbonyl trichloride) of glycidol (compound 2), 1.34 grams of triethyl amine (10 mol.% of the 1,3,5-benzenetricarbonyl trichloride), and 52.25 ml of solvent (anisol) was slowly added to the above solution at 0° C. over 3 hours and the reaction continued at room temperature for another 5 hours to form primarily multifunctional monomer (compound 3).

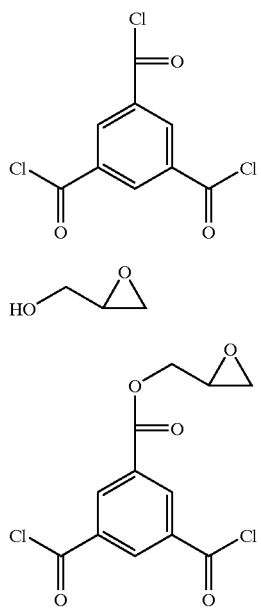

Synthesis of Hyperbranched Polyester from multifunctional monomer (3) in the presence of catalyst: 0.22 grams of Bu$_4$NBr was added to 15 ml of above-described multifunctional monomer solution in anisol under nitrogen. The solution was stirred at 100° C. for 2 hrs. The white powder polymer was obtained by pouring the polymer solution to a large excess amount of methanol in the presence of a few drops of triethylamine. The polymer was dried under vacuum with a 90% yield and characterized by GPC using polystyrene as calibration standard to determine the molecular weight and molecular weight distribution as defined by the ratio of weight average molecular weight (Mw) to number average molecular weight (Mn). GPC of final polymer: Mn=1350, Mw/Mn=1.70.

Example 2

Esterification of Acid Chloride Ended Hyperbranched Polyester with 2-chloroethanol The acid chloride ended hyperbranched polyester solution as produced in example 1 (4 grams) was added with 2.66 ml of 2-chloroethanol at room temperature. The solution was stirred at 60° C. overnight. The product was precipitated in 300 ml of cold ether to give a white powder product. $^1$H NMR showed a complete esterification.

Example 3

Quaternization of 2-chloroethanol-esterfied Polymer with 2-(dimethylamino)ethanol To a 50 ml round bottom flask, 3 grams of polymer as produced in example 2 was dissolved in 17 ml of DMF. 3 grams of 2-(dimethylamino)ethanol was added to the above solution and the mixture was stirred at 60° C. for 5 hrs. A fine white powder product was obtained by precipitation from cold methanol and dried under vacuum. $^1$H NMR spectrum showed the formation of the expected quarternized product. The product is partially soluble in acetone or in water, and completely soluble in acetone/water (10/90 by volume) mixture.

Example 4

Amidation of Acid Chloride Ended Hyperbranched Polyester with Jeffamine M-1000

The acid chloride ended hyperbranched polyester as produced in example 1 (1 gram) and 2 grams of JeffamineM-1000 (Huntsman) were mixed with 4 ml of toluene in a 10 ml round bottom flask. The solution was allowed to react at room temperature for 15 min. $^1$H NMR of the product showed the formation of a water dispersible star polymer.

Example 5

Amidation of Acid Chloride Ended Hyperbranched Polyester with 3-(dimethylamino)propylamine A mixture of 7.6 grams of 3-(dimethylamino) propylamine, 0.63 grams of triethylamine, and 62 ml of DMF was slowly added to 73 grams of 30% hyperbranched polymer solution in anisol as prepared in example 1. The reaction was carried out at room temperature for one hour. Polymer was precipitated from 2 L of cold ether. The polymer is water-soluble.

Example 6

Synthesis of Hyperbranched Polyester with Attached Photographic Coupler

To a three neck round bottom flask, a magenta dye forming coupler intermediate (3.4 g) with the following structure and 0.24 grams of triethylamine were added with 35 ml of DMF.

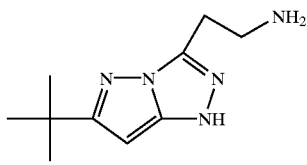

30 grams of polymer solution as prepared in example 1 was added dropwise to the above coupler DMF solution at room temperature. The resulting solution was allowed to stir under nitrogen for 2 hours. After the allotted reaction time, the product was precipitated in 500 mL of 50:50 water-:methanol mixture.

Example 7

Synthesis of Hyperbranched Polyester from Multifunctional Monomer (3) in the Absence of Additional Catalyst The monomer synthesis is the same as in example 1. The polymer was prepared directly from heating 5.9 grams of monomer solution at 100° C. for 2 hrs. The white powder polymer was obtained by pouring the polymer solution to a large excess amount of methanol in the presence of a few drops of triethylamine. The polymer was dried under vacuum with a 20% yield and characterized by GPC using polystyrene as calibration standard to determine the molecular weight and molecular weight distribution as defined by the ratio of weight average molecular weight (Mw) to number average molecular weight (Mn). GPC of final polymer: Mn=925, Mw/Mn=1.83.

The invention has been described in detail with particular reference to certain preferred embodiments thereof, but it will be understood that variations and modifications can be effected within the spirit and scope of the invention.

What is claimed is:

1. A polymerization process for producing highly branched polyesters comprising reacting functional groups A and B of multi-functional branching monomer reactants of the formula A—L—B$_n$, where one of A and B represents an epoxide group, the other of A and B represents an acid chloride group, L represents a linking group between A and B, and n is at least 2; wherein polymerization proceeds by reaction of an epoxide group of a first monomer with an acid chloride group of second monomer to open the epoxide group ring and form a reaction product having an ester linkage between the first and second monomers, and repeating such esterification reaction between additional epoxide groups and acid chloride groups of the multifunctional monomers and reaction products of the multifunctional monomers to form a highly branched polyester.

2. A process according to claim 1, wherein n is 2 or 3.

3. A process according to claim 1, wherein n is 2.

4. A process according to claim 3, wherein L comprises a further substituted or unsubstituted straight or branched alkyl, cycloalkyl, aryl or alkylaryl linking group moiety, or an oligomeric or polymeric chain moiety.

5. A process according to claim 4 wherein L comprises a straight or branched alkyl, cycloalkyl, aryl or alkylaryl moiety.

6. A process according to claim 5, wherein A represents an epoxide group and B represents an acid chloride group.

7. A process according to claim 5 wherein B represents an epoxide group and A represents an acid chloride group.

8. A process according to claim 4, wherein the polymerization is performed in the presence of an onium salt, polyether or cryptand based complex, or amine containing Lewis base as a catalysts.

9. A process according to claim 1, wherein L comprises a further substituted or unsubstituted straight or branched alkyl, cycloalkyl, aryl or alkylaryl linking group moiety, or an oligomeric or polymeric chain moiety.

10. A process according to claim 1, wherein L comprises a straight or branched alkyl, cycloalkyl, aryl or alkylaryl moiety.

11. A process according to claim 1, wherein A represents an epoxide group and B represents an acid chloride group.

12. A process according to claim 1, wherein B represents an epoxide group and A represents an acid chloride group.

13. A process according to claim 1, wherein the multifunctional branching monomer is:

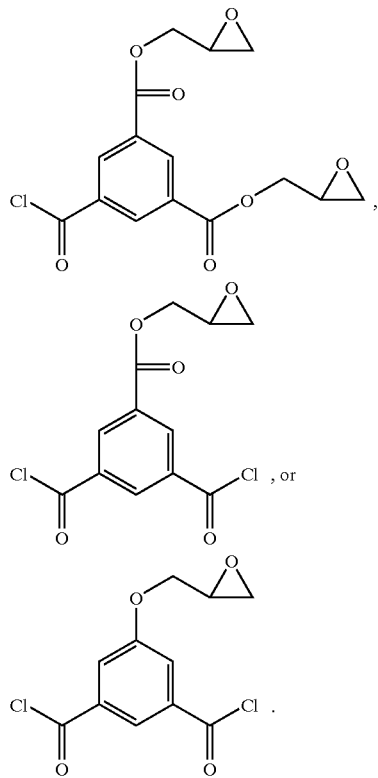

14. A process according to claim 13, wherein the polymerization is performed in the presence of an onium salt, polyether or cryptand based complex, or amine containing Lewis base as a catalysts.

15. A process according to claim 1, wherein the polymerization is performed in the presence of an onium salt, polyether or cryptand based complex, or amine containing Lewis base as a catalysts.

16. A branched polyester obtained from the process of claim 1, having a number average molecular weight of at least 1000 and a ratio of weight average molecular weight to number average molecular weight of less than 2.

17. A branched polyester according to claim 16, wherein the multi-functional branching monomer polymerized in the process is:
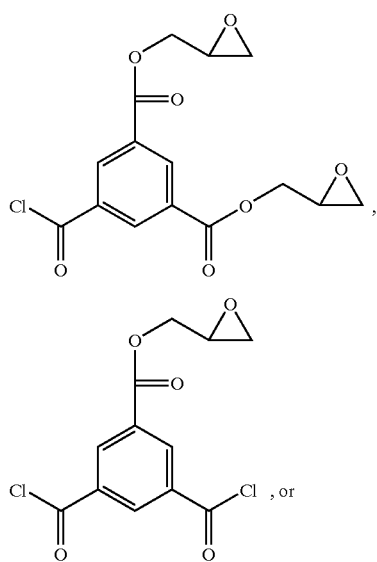
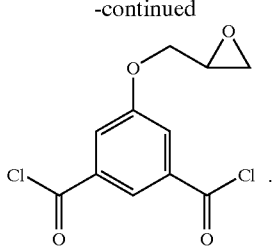
18. A branched polyester according to claim 16, wherein the multi-functional branching monomer polymerized in the process is:
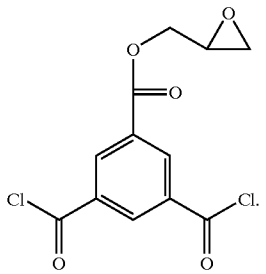
* * * * *